US009519900B2

(12) United States Patent
Fredell et al.

(10) Patent No.: US 9,519,900 B2
(45) Date of Patent: Dec. 13, 2016

(54) SECURE TWO PARTY MATCHING TRANSACTION SYSTEM

(71) Applicant: SEQR Group AB, Stockholm (SE)

(72) Inventors: Peter Fredell, Vaxholm (SE); Mikael Signarsson, Upplands Vaesby (SE)

(73) Assignee: SEQR Group AB, Stockholm (SE)

( * ) Notice: Subject to any disclaimer, the term of this patent is extended or adjusted under 35 U.S.C. 154(b) by 0 days.

(21) Appl. No.: 14/347,742

(22) PCT Filed: Sep. 27, 2012

(86) PCT No.: PCT/SE2012/051027
§ 371 (c)(1),
(2) Date: Mar. 27, 2014

(87) PCT Pub. No.: WO2013/048322
PCT Pub. Date: Apr. 4, 2013

(65) Prior Publication Data
US 2014/0297440 A1    Oct. 2, 2014

Related U.S. Application Data

(60) Provisional application No. 61/539,645, filed on Sep. 27, 2011.

(30) Foreign Application Priority Data

Sep. 27, 2011 (EP) ..................................... 11182892
Feb. 3, 2012 (SE) ..................................... 1200074
(Continued)

(51) Int. Cl.
*G06G 1/12* (2006.01)
*G06Q 20/00* (2012.01)
(Continued)

(52) U.S. Cl.
CPC ........ *G06Q 20/3278* (2013.01); *G06Q 20/202* (2013.01); *G06Q 20/3276* (2013.01)

(58) Field of Classification Search
None
See application file for complete search history.

(56) References Cited

U.S. PATENT DOCUMENTS 8,332,323 B2 * 12/2012 Stals et al. .................. 705/44
2005/0096011 A1    5/2005 Yoshida et al.
(Continued)

FOREIGN PATENT DOCUMENTS

EP    1 528 518 A1    5/2005
EP    2 088 549 A1    8/2009
(Continued)

OTHER PUBLICATIONS

International Search Report for corresponding application No. PCT/SE2012/051027 dated Feb. 21, 2013.
(Continued)

*Primary Examiner* — Ryan Zeender
*Assistant Examiner* — Christopher Buchanan
(74) *Attorney, Agent, or Firm* — Renner, Otto, Boiselle & Sklar, LLP.

(57) ABSTRACT

The invention relates to a method, and an arrangement (A) for identifying a purchaser (1) and a retailer (2) and performing an economical transaction between the purchaser (1) and the retailer (2) at a point of sale (21), where the purchaser (1) has a mobile device (11), and where the point of sale (21) communicates with a transaction system (3). The transaction system (3) transfers funds (31) from the purchaser to the retailer according to given information from the purchaser and the retailer. The inventive method, and arrangement comprise the steps of; the mobile device (11) reading an identity of the point of sale (24) by means of a at
(Continued)

least one of a camera, and a radio frequency receiver comprised in the mobile device (11), the mobile device (11), and point of sale generates and transmits messages comprising the identity of the point of sale (24) and the identity of the mobile device (14) through different channels of communication. Furthermore, the invention comprises computer program products conducting the software code needed for the invention to be carried out.

21 Claims, 2 Drawing Sheets

(30) Foreign Application Priority Data

Feb. 10, 2012 (SE) ........................................ 1200088
Feb. 16, 2012 (SE) ........................................ 1200097

(51) Int. Cl.
*G06Q 20/32* (2012.01)
*G06Q 20/20* (2012.01)

(56) References Cited

U.S. PATENT DOCUMENTS

| | | |
|---|---|---|
| 2005/0102233 A1 | 5/2005 | Park et al. |
| 2006/0018450 A1* | 1/2006 | Sandberg-Diment ...... 379/93.12 |
| 2008/0222048 A1 | 9/2008 | Higgins et al. |
| 2009/0150248 A1* | 6/2009 | Ling et al. ...................... 705/17 |
| 2009/0157505 A1* | 6/2009 | Yokoyama ...................... 705/14 |
| 2009/0254485 A1 | 10/2009 | Baentsch et al. |
| 2009/0298427 A1* | 12/2009 | Wilkinson et al. .......... 455/41.1 |
| 2010/0320266 A1* | 12/2010 | White ............................ 235/375 |
| 2011/0131104 A1 | 6/2011 | Rose et al. |
| 2011/0225057 A1* | 9/2011 | Webb et al. .................... 705/16 |
| 2012/0290421 A1* | 11/2012 | Qawami et al. ................ 705/21 |
| 2013/0006785 A1* | 1/2013 | Perkins et al. ................. 705/18 |

FOREIGN PATENT DOCUMENTS

| | | |
|---|---|---|
| EP | 2088549 A1 | 8/2009 |
| JP | 2007-034980 A | 2/2007 |
| WO | 01/09808 | 2/2001 |
| WO | 2011/113874 A2 | 9/2011 |

OTHER PUBLICATIONS

Extended European Search Report for corresponding patent application No. 12836412.2 dated Jul. 17, 2014.
Office Action with translation for corresponding Japanese patent application No. 2013-555395 dated Aug. 18, 2014.
Jerry Gao et al., "A 2D Barcode-Based Mobile Payment System", Multimedia and Ubiquitous Engineering, Jun. 4, 2009, pp. 320-329.

* cited by examiner

SECURE TWO PARTY MATCHING TRANSACTION SYSTEM

This application is a national phase of International Application No. PCT/SE2012/051027 filed Sep. 27, 2012 and published in the English language.

TECHNICAL FIELD

The present invention pertains to a method, arrangement, and computer program products adapted to identify a purchaser and a retailer where the purchaser is in front of a retailer point of sale, and performing a secure electronic payment between the purchaser and the retailer, whereby the purchaser has a mobile device comprising a camera or RFID or WIFI and like radio frequency receivers and/or transmitters utilized to conduct a purchase,

BACKGROUND ART

It is known to utilize transaction systems where through funds/payment can be transmitted from one part to another, the parties having agreements and accounts with a vendor, bank, credit supplier or other financial institution. The transaction system requires at least an identification of the two parties, account details for the two parties and an order from the paying part to perform the transaction.

The two parties can be a purchaser and a retailer where funds are to be moved from the purchaser to the retailer as for instance payment for goods, services and the like. The purchaser is present at a point of sale belonging to the retailer. It is then known that the purchaser identifies himself at the point of sell and that the point of sell transmits required information to the transaction system, which is information identifying the buyer/purchaser, the seller/retailer and the sum of money that is to be transferred.

There are many known manners to identify the purchaser at the point of sale. The most common manner is for the purchaser to identify himself with some kind of credit or bank card in combination with an identification card or a personal code provided by the purchaser to the point of sale. A credit or bank card can be a smart card which can communicate with the point of sale and thereby identify the purchaser. A smart card, or unique information from a SIM card in a mobile device, such as a telephone number, can be utilized in combination with a personal code, preventing the use of the smart card or mobile device by anyone else but the rightful user.

It is also known that purchasers having a mobile device, such as a smart phone or any other kind of mobile computer, through which it is possible to identify the purchaser. Such mobile device can be adapted to identify the purchaser to the point of sale by means of radio frequency identification (RFID) or near field communication (NFC). Many times these mobile devices are adapted to data communication via Internet or a cell phone network in which case the mobile device has a subscriber identity module (SIM card) through which both the device and the purchaser can be identified. It is known to utilize the possibilities to read the SIM card remotely from a point of sale by means of RFID or NFC and thereby obtaining information on the identity of the purchaser.

Regardless of how the purchaser identifies himself at the point of sale, the match between the purchaser and the retailer is made at the point of sale and required information is transmitted from the point of sale to the transaction system where the transaction can be made.

Confirmation of the performed transaction is transmitted from the transaction system to the point of sale and the point of sale provides a receipt to the purchaser. It is a technical problem to identify both purchaser and retailer at a point of sale so that required information for the transfer of funds in a transaction system can be gathered in a safe and secure manner.

The use of mobile devices is increasing and a demand is rising to use these devices for the identification of a purchaser at a point of sale. It is an economical investment to provide means for communication between the point of sale and the mobile device of a purchaser. The increased hardware complexity for the point of sale also means increased support and service in order to provide a safe and reliable use of this technology.

It is thus a problem to provide the possibility to identify the purchaser by means of a mobile device at a point of sale utilizing remote communication between the mobile device and the point of sale. Moreover, it is a problem that a purchaser has to provide the point of sale with secret information such as a personal identity code (PIN). Although a cashier at the point of sale is unable to read such secret information, it is transmitted from the point of sale (POS), and can be eavesdropped or manipulated.

Patent application documents US 2008/222048 A1 (048') to Higgins et al, US 2005/096011 A1 (011') to Youshida et al, EP 2 088 549 A1 (549'), US 2005/102233 A1 (233') to Shu et al, and US 2010/320266 A1 (266') to White, which in large describe electronic payment systems that are inherently insecure due to that a retailer and purchaser device communicate directly, and thus expose PIN-codes and identities to theft/eavesdropping. In the present inventions in accordance with the below solution, a retailer and a buyer only communicate with a transaction system utilizing for instance encryption and private keys on their own devices. This solution is not disclosed in the application documents 048', 011', 549', 233', and 266' mentioned in the latter, In order to accomplish a full payment traceability, and authentication, the solution according to the below embodies a payer centric public key infrastructure (PKI) solution where communication is signed and where the transaction server keeps records over payer certificates, this problem is not addressed in 048', 011', 549', 233', and 266'. A PKI solution is a set of hardware, software, people, policies, and procedures needed to create, manage, distribute, use, store, and revoke digital certificates.

Utilizing an SMS as authentication mechanism as in 048' is not secure. Hence, the present invention as described below improves over this solution by encrypting all communication end-to-end without directly connecting a purchaser and retailer. Thus it eliminates the need for insecure, unchecked communication between MCD and MPD such as disclosed by 048'.

The 011' patent application document is a specifically web-based solution involving a sales person as an operator. This is not required by the present invention as disclosed below where web input or operator supervision is not necessary/impossible, as the purchaser as described below is at a point of sale or in front of a point of sale. In the solution according to the present invention a retailer posts a bill automatically to an invention transaction system and the purchaser receives payment information such as receipts without having to enter a web page.

Document 549' depends on a Credit Card Clearing House (CCCH), whereas the solution to the present invention is independent of any specific CCCH and instead embodies a transaction server, which directly communicates with banks and/or value store accounts.

Application document 233' utilizes a display to provide information to a phone from a vending machine. The present invention differs from this solution by having a sticker-code identifying a point of sale and handing information between seller and buyer in a transaction server. Also, the mobile device described in 233' communicates with a vendor server via an URL, not directly to a transaction server, thus only function as a web-redirect, not a trusted payment processor.

The 266' document discloses single sided communication, and fails to solve the problem of providing information from the point of sale via a transaction server, so it is hard for a purchaser to verify that the amount and bill corresponds to the correct cash-register, as depicted in 266' image 1, S221-S223.

In the present inventions solution as described below, the mobile device is capable of receiving a digital receipt of the payment from the transaction service transmitted and signed from the selling cash-register. Documents 048', 011', 549', 233', and 266' rely on the cash-register to print a receipt, thus knowing/registering the purchasers particulars such as bank account, name, and even their PIN code although encoded.

SUMMARY OF THE INVENTION

With the purpose of solving one or more of the problems mentioned in the latter, and from the standpoint of the field of invention as described in the latter, the present invention teaches that instead of the point of sale reading the identity of the mobile device, it is appreciated that the mobile device is reading an identity of the point of sale by means of a camera/RFID, radio frequency identification, and like radio frequency receivers comprised in the mobile device.

Many mobile devices today are equipped with a camera and radio frequency receivers and/or transmitters so this does not require any extra hardware modifications of the mobile device or the point of sale.

It is appreciated that the mobile device generates and transmits a message to the transaction system, the message comprising the identity of the point of sale and the identity of the mobile device.

In accordance with one embodiment, the present invention provides that a purchaser is never identified by a point of sale, i.e. a purchaser is totally anonymous to the retailer running the point of sale.

The point of sale generates and transmits a message; independent by time from a message transmitted from a purchaser utilizing its mobile device to purchase to a transaction system in accordance with the present invention, the point of sale message comprises the identity of the point of sale and the sum to be paid.

The transaction system makes a match between those messages, by means of the identity of the point of sale. This means that the match between the purchaser and the retailer is not accomplished at the point of sale, as in known systems, but in the transaction system, which is the only device that has knowledge about the purchaser.

The transaction system generates and transmits messages to the mobile device, such as messages comprising the sum to be paid as received in a message from the POS.

The purchaser approves the sum to be paid on the mobile device, and the mobile device generates and transmits a message to the transaction system, the message comprising an approval or rejection of the transfer of funds from the purchaser to the retailer according to the approved sum to be paid.

The transaction system has now received required information to perform the transaction and the transaction system performs the transfer of the approved funds from the purchaser to the retailer.

As the transaction has been performed, the transaction system generates and transmits a message to the point of sale, which message comprises a confirmation of the transfer of funds/payment.

In this manner, both the purchaser and the retailer are identified, and the transaction system can perform the transaction based on information received from both the purchaser and the retailer in a safe and secure manner.

In one embodiment of the present invention, it is appreciated that the purchaser is using a personal code on the mobile device to approve the sum to be paid in order to increase safety and prevent unauthorized persons to utilize the mobile device for economical transactions.

In another embodiment, the identity of the point of sale is represented by a tag/label, and the mobile device translates the tag/label into the identity of the point of sale by utilizing suitable software to accomplish this. Such a tag/label can for instance be a bar code, a quick response code (QR) such as a 2D or 3D QR code, RFID, and like codes, a data-matrix, or a proprietary code such as a ShotCode, which is a barcode that comprises a dartboard-like circle with a bulls eye in the center and data-circles surrounding it. The technology to read data-bits from these data-circles is by measuring the angle, and distance from the bulls-eye. They are read by cameras such as found on a cellular phone, touchpads and like devices.

These codes can easily be produced and displayed at the point of sale so that it is available for the purchaser to utilize the camera of the mobile device to read the tag/label. In a big supermarket or place of business with many points of sale it is inexpensive and easy to provide each point of sale with its individual identity. Computer programs required to read such tags and translate it into an understandable identification are readily available for most mobile devices equipped with a camera.

The point of sale can be a physical point of sale, in which case it can be a stationary point of sale, such as a warehouse, a supermarket, a restaurant, a hair dresser or a petrol station, or a mobile point of sale, such as a point of sale that belongs to a bus, a train, a boat, a taxi, a mobile sales representative, or a mobile point of sale in a restaurant and the like.

According to one appreciated embodiment it is possible that a personal device function as a point of sale, and that two persons, the owner of the personal device, retailer, and the purchaser, utilize the present inventive method of the present invention to transmit/send funds from the purchaser to the owner of the personal device, the personal device being any personal device where through the owner of the personal device can access the transaction system, such as a cellular telephone, a mobile computer, touchpad, smart phone, a stationary computer or the like.

It is appreciated that the point of sale in one embodiment is a cashier register and that the cashier register generates messages and receives messages.

With a physical point of sale it is appreciated that the point of sale generates a receipt for the transaction to the purchaser in one embodiment.

The present invention can also be utilized where the point of sale is a virtual point of sale, such as an online shop available on the Internet.

In this case the actual point of sale can be a server related to the retailer, where the server generates messages and receives the messages relating to a purchase.

When the point of sale is physical it is approachable by the purchaser and handles only one purchaser at the time. However, with a virtual point of sale, such as an online Internet shop, many purchasers can approach the point of sale simultaneously. It is thus appreciated that for a virtual point of sale a unique identity for the point of sale is generated and a representation of the unique identity is displayed for each transaction.

Regardless of if the point of sale produces a receipt or not, the present invention proposes that the transaction system can generate and transmit a message to the mobile device, the message comprising a confirmation of the transfer of funds.

If the point of sale is mobile it is appreciated that the point of sale communicates with the transaction system by means of wireless communication.

It is also appreciated that the mobile device communicates with the transaction system by means of wireless communication.

The present invention also relates to an arrangement comprising a mobile device, a point of sale and a transaction system. The arrangement is adapted to identify a purchaser and a retailer and to perform an economical transaction between the purchaser and the retailer, the point of sale belonging to the retailer and the mobile device belonging to the purchaser. The point of sale and the transaction system are adapted to communicate with each other, and the transaction system is adapted to transfer funds from the purchaser to the retailer according to given information from the purchaser and the retailer.

Also, the present invention specifically teaches that the mobile device and the transaction system are adapted to communicate with each other and that the mobile device comprises a camera and radio frequency communication abilities.

Moreover, the mobile device is adapted to read an identity of the point of sale by means of its camera/radio receiver and to generate and transmit a message to the transaction system, the message comprising the identity of the point of sale and the identity of the mobile device.

The point of sale is adapted to generate and transmit a message, independently differentiated by time from the message transmitted from said mobile device to the transaction system. This message comprises the identity of the point of sale and the sum to be paid.

Furthermore, the transaction system is adapted to match the both messages by means of the identity of the point of sale and to generate and transmit another message to the mobile device, which comprises the sum to be paid.

The mobile device is adapted to receive an approval or rejection of the sum to be paid from the purchaser, and to generate and transmit a further message to the transaction system, the message comprising an approval or rejection of the transfer of funds from the purchaser to the retailer according to the approved sum to be paid.

The transaction system is adapted to perform the transfer of the approved funds from the purchaser to the retailer, and to generate and transmit another message to the point of sale, which comprises a confirmation of the transfer of funds.

It is possible for the purchaser to approve the sum to be paid, and the present invention proposes that one such manner of approval is that the mobile device is adapted to receive a personal code from the purchaser in order for the purchaser to approve the sum to be paid.

With the purpose of providing an inexpensive and innovative means of identifying the point of sale it is appreciated that the identity of the point of sale is represented by a tag/label, and that the mobile device is adapted to translate the tag/label into the identity of the point of sale.

A tag/label can be of many different types such as a bar code, RFID, a quick response code, a data-matrix, or a proprietary code such as a ShotCode.

As mentioned a point of sale can be either a physical point of sale or a virtual point of sale.

A physical point of sale can be a stationary point of sale, such as a warehouse, a restaurant, a hair dresser or a petrol station, or a mobile point of sale, such as a point of sale that belongs to a bus, a train, a boat, a taxi, a mobile sales representative or a mobile point of sale in a restaurant.

One appreciated embodiment of the present invention teaches that a personal device is adapted to function as a point of sale, where the personal device and the mobile device are adapted to enable two person, the owner of the personal device and the purchaser, to transmit funds from the purchaser to the owner of the personal device. The personal device can be any personal device where through the owner of the personal device can access the transaction system, such as a cellular telephone, a mobile computer, iPad™, touchpad, smart phone such as an iPhone™, android phone, or a stationary computer and the like.

If the point of sale is a traditional cashier register, then the cashier register can be adapted to generate and receive messages.

A virtual point of sale can be hosted by a server related to the retailer and can for instance be an online shop available on the Internet, in which case the server can be adapted to generate the messages and receive messages.

In order to enable several purchasers to interact simultaneously with a virtual point of sale it is appreciated that the server is adapted to generate a unique identity for the point of sale for each transaction and to display a representation of the identity on the virtual point of sale.

Independent from the possibility for the purchaser to receive a receipt from the point of sale, it is appreciated that the transaction system can be adapted to transmit a message to the mobile device, the message comprising a confirmation of the transfer of funds.

If the point of sale is mobile then it is appreciated that the point of sale is adapted to communicate with the transaction system by means of wireless communication.

It is also appreciated that that the mobile device is adapted to communicate with the transaction system by means of wireless communication.

The present invention also relates to a number of computer program products. Since the inventive method and arrangement involves three devices, the mobile device, the point of sale and the transaction system, three separate computer program products are required to realize the invention.

Hence, the present invention sets forth a method adapted to identify a purchaser and a retailer, and performing, where said purchaser is in front of said retailer point of sale, a secure electronic payment between the purchaser and the retailer, whereby the purchaser has a mobile device comprising at least one of a camera /RFID/WIFI, radio frequency receivers and/or transmitters utilized to conduct a purchase. The invention thus comprising:

both the point of sale, and the purchaser are to communicate with an account aware transaction system, the transaction system settling the transfer of payment from the purchaser to the retailer by signals transmitted through different channels of communication, whereby the point of sale communicates through at least one of a wired first channel, and a wireless first channel of communication, and the mobile device communicating wireless via a second channel through radio;

a single purchase is provided a unique transaction reference through said transaction system;

the mobile device being operated by the purchaser to identify the point of sale by means of the camera/RFID and like radio frequency receivers photographing or reading a tag placed at the point of sale uniquely identifying the single point of sale;

the mobile device is generating and transmitting a signed message to the transaction system through the second channel, the message comprising the identity of the point of sale and the identity of the mobile device derived through software processing the photographed/read tag;

automatically by prompting generating through the point of sale at least one message, and transferring the at least one message on the first channel, independently differentiated by time from the message transmitted from the mobile device to the transaction system on the second channel, to the transaction system, the at least one message comprising at least the identity of the point of sale and the sum to be paid by the purchaser;

matching through the transaction system the at least one message transmitted from the point of sale through the first channel with the message transmitted from the mobile device through the second channel to decide similarity through the identity of the point of sale; and the purchaser approving the sum to be paid by prompting the mobile device to transmit to the transaction system a go-ahead if the matching determines similarity between the point of sales identity transmitted via the first and second channel, the purchasers particulars thus being anonymous to the point of sale, but both the point of sale and the purchasers purchase identity being known by the transaction system settling the payment by withdrawing payment from the purchaser, and crediting the account relating to the point of sale for said unique transaction reference provided to a single purchase.

One embodiment of the present invention provides that the purchaser utilizes a personal code on the mobile device to approve the sum to be paid.

Another embodiment provides that the tag/label is at least one of a bar code, RFID, a quick response code, a data matrix, and a proprietary code.

Still another embodiment provides that the point of sale is a stationary point of sale at a retailer.

A further embodiment provides that the point of sale is a mobile point of sale provided in a bus, a train, a boat, a taxi, handled by a mobile sales representative, or a mobile point of sale in a restaurant.

Still a further embodiment provides that a portable device functions as a point of sale, and that two persons, the owner of the personal device, and the purchaser having a mobile device, utilizes the devices to transmit funds from the purchaser to the owner of the point of sale device, the devices being devices by which they access the transaction system, whereby the point of sale is at least one of a cellular telephone, smart phone, a laptop computer, an iPad™, touchpad, iPhone™, android phone, and a stationary computer, and the like.

Yet one embodiment provides that the point of sale is a cashier register, and that the cashier register is generating messages by prompting it.

Still yet one embodiment provides that the point of sale generates a receipt to the purchaser.

Yet still one embodiment provides that the point of sale is a virtual point of sale.

A further embodiment provides that the point of sale is an online shop available on the Internet.

Another embodiment comprises that the point of sale is a server related to the retailer, and that the server generates at least one message to the transaction system, and receives messages from the transaction system.

Moreover, the present invention sets forth an arrangement adapted to identify a purchaser and a retailer, and performing a secure electronic payment between the purchaser where said purchaser is in front of said retailer point of sale, whereby the purchaser has a mobile device comprising a camera /RFID/WIFI and like radio frequency receivers and/or transmitters utilized to conduct a purchase. Hence, the present invention arrangement comprises:

an account aware transaction system adapted to communicate with both the point of sale, and the purchaser, which settles transfer of payment from the purchaser to the retailer by encrypted signals transmitted through different channels of communication, whereby the point of sale communicates through at least one of a wired first channel, and a wireless first channel of communication, and the mobile device communicates wireless via a second channel via radio frequency;

means in the transaction system to provide each single purchase with a unique transaction reference;

the mobile device adapted to be operated by the purchaser to identify the point of sale by means of the camera/RFID and like radio frequency receivers and/or transmitters photographing/reading a tag placed at the point of sale uniquely identifying the single point of sale;

a software adapted to generate through the mobile device, and transmitting at least a first encrypted and signed message to the transaction system through the second channel, the message comprising the identity of the point of sale and the identity of the mobile device derived through software processing the photographed/read a tag;

adapted to automatically, by prompting, generate through the point of sale at least one message, and transferring the at least one message on the first channel, independently differentiated by time from the message transmitted from the mobile device to the transaction system on the second channel, to the transaction system, the at least one message comprising at least the identity of the point of sale and the sum to be paid by the purchaser;

a software matching means, to match through the transaction system the at least one encrypted message transmitted from the point of sale through the first channel with the at least one message transmitted from the mobile device through the second channel to decide similarity through the identity of the point of sale; and approving means with which the purchaser approves the sum to be paid by prompting the mobile device to transmit to the transaction system a go-ahead if the matching determines similarity between the point of sales identity transmitted via the first and second channel, the purchasers particulars thus being anonymous to the point of sale, but both the point of sale and the purchasers identity being known by the transaction system settling the payment by withdrawing payment from the purchaser, and crediting the account relating to the point of sale for each single transaction identity.

Furthermore, the present invention provides a computer program product comprising computer program code, which when executed by a mobile device enables the mobile device, comprising a camera/RFID/WIFI and like radio frequency receivers and/or transmitters, to perform the steps of:

reading an identity by software in the mobile device at a single point of sale by means of the camera/RFID and like radio frequency receivers taking a footage or reading the identity; and transmitting the identity to an account aware transaction system.

In one embodiment the computer program product sets forth that suitable parts regarding the mobile device conduct the method of the attached claims 1 to 13 in program code.

Still further the present invention provides a computer program product comprising computer program code, which, when executed by a single point of sale enables the point of sale wherein suitable parts relating to the point of sale conducts the method steps of claims 1 to 13 in program code to perform the steps of:

transmitting its identity by prompting it to perform the transmission; and transmitting the identity to an account aware transaction system.

Moreover, the present invention provides a computer program product comprising computer program code, which, when executed by an account aware transaction system enables the system to perform suitable parts, relating to the transaction system, of the method steps of the attached claims 1 to 13 in program code to perform the steps of:

matching the transmitted identities from a mobile device, and a point of sale;

settling the accounts in a purchase between a mobile device, and a point of sale; and transmitting messages to the point of sale, and the mobile device.

It is appreciated that the attached dependent arrangement claims adhere to the attached dependent method claims.

BRIEF DESCRIPTION OF THE DRAWINGS

Henceforth, reference is had to the accompanying drawings throughout the present description for a better understanding of the present inventions embodiments, and given examples, wherein.

A DETAILED DESCRIPTION OF PREFERRED EMBODIMENTS

One advantage of a method, an arrangement and computer program products according to the present invention is that a safe transaction of funds between a purchaser and a retailer can be provided within the current infrastructure for signalling from a point of sale via a backend system, without any extra hardware. Mobile devices, such as smart phones, cellular phones, or mobile computers, are equipped with a camera and radio frequency receivers and/or transmitters and a wireless online connection to different data systems, and points of sale today are also equipped with a communication connection to some kind of transaction system. The only physical or hardware change required is a visual identity of the point of sale that can be read by the mobile device with its camera/RFID and like radio frequency receivers, an RFID tag can be passive or active, which can be printed and/or attached to the point of sale for a very low cost.

Since the match between the purchaser and the retailer is made in the transaction system, and not in the point of sale, the point of sale does not have to manage any issues regarding identification of the purchaser. This relieves the point of sale from the problems of identifying the purchaser, and the purchaser does not have to reveal any personal information to the retailer at the point of sale, thus removing the risk of misuse of such personal information, which is an advantage not only at physical points of sale but also at virtual points of sale where there are many problems around identifying the purchaser without compromising the personal integrity of the purchaser.

Hence, the present invention can be implemented in all kinds of points of sale, both mobile and stationary physical points of sale and virtual points of sale. The invention can even be implemented as a manner to transfer funds between persons, where one person's personal device can act as a point of sale and produce and show an identity which is read by another person's mobile device, the other person acting as a purchaser, and the invention can be utilized between these persons to move funds from one person to the other.

It is also an advantage that the present invention can be utilized to introduce the possibility for new merchants to set up a point of sale with a simple computer that can communicate with a transaction system, which is an advantage for businesses with small economical means. The invention also opens the possibilities for economical transactions without having to manage cash, which is an advantage in areas where crime is a problem.

Figure 1:
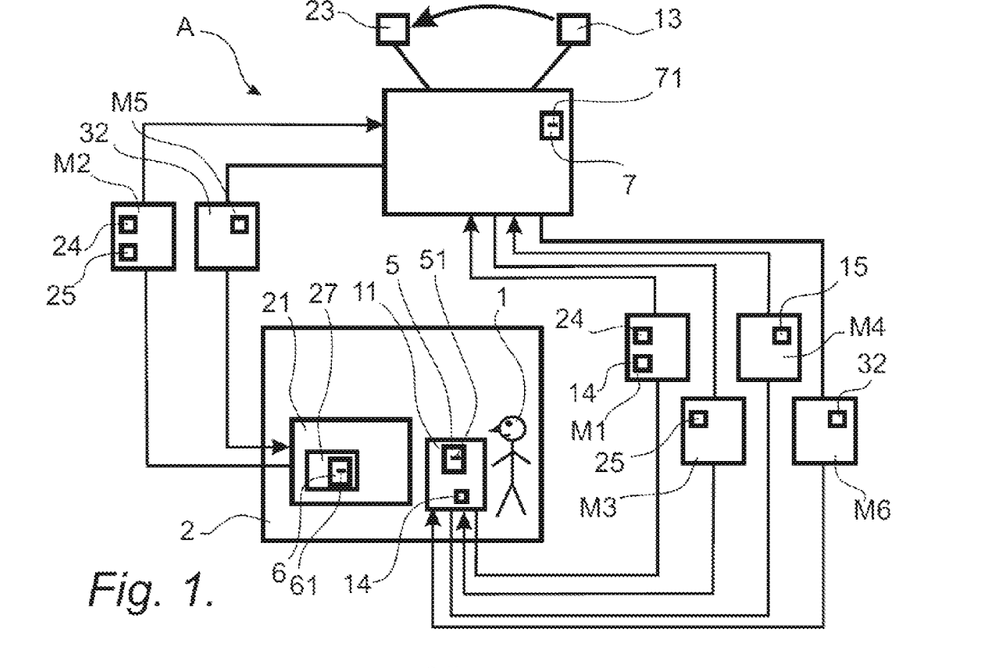
FIG. 1 is a schematic illustration of a method and arrangement according to the present invention.

Now, describing the present invention with reference to FIG. 1, illustrating a method to identify a purchaser 1 and a retailer 2. The purchaser 1 is present at a point of sale 21, and for performing an economical transaction/purchase between the purchaser 1 and the retailer 2.

The purchaser 1 has a mobile device 11, which can be anything through which the purchaser can access online communication with a transaction system 3, such as a smart phone, a personal digital assistant, or a mobile computer. The point of sale 21 can also communicate with the transaction system 3. The mobile device has a unique identity 14, which is connected to the owner of the mobile device, the purchaser 1. This unique identity can for instance be a telephone number, or a subscriber identity found on a SIM card belonging to the device.

The transaction system 3 transfers funds 31 from one economical institution 13 utilized by the purchaser 1 to an economical institution 23 utilized by the retailer 2 according to given information from the purchaser 1 and the retailer 2. In this example the purchaser and the retailer utilize different economical institutions, 13, 23. However, it should be appreciated that the purchaser 1 and the retailer 2 can utilize the same economical institution.

Figure 2:
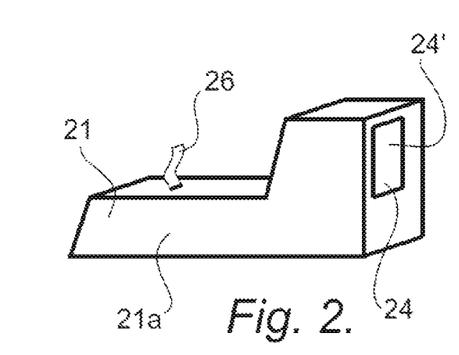
FIG. 2 is a schematic illustration of a mobile device and a point of sale.

With reference to FIGS. 1 and 2 it is shown that the inventive method in one embodiment of the present invention comprises the following steps, whereby the mobile device 11 reads an identity 24 at the point of sale 21 by means of a camera/RFID and like radio frequency receivers 111 comprised in the mobile device 11. The mobile device in the present invention can be a device that communicates via any kind of radio frequency transmitting entity such as cellular radio communication, and WIFI communication to a broadband system. Hereby a mobile device can be of the type with our without a SIM card, thus for WIFI communication without a SIM card. Examples of such devices are such as a cellular telephone, a mobile computer, an iPad™, touchpad, iPhone™, android phone, or stationary computer and the like.

Furthermore, the mobile device 11 generates and transmits a message M1 to the transaction system 3, the message M1 comprises the identity 24 of the point of sale 21 and the identity 14 of the mobile device.

Henceforth, the point of sale generates and transmits a message M2, independently differentiated by time, from the message M1, to the transaction system 3, the message M2 comprising the identity 24 of the point of sale 21 and the sum to be paid 25 in the transaction.

Hereby, the transaction system 3 matches the message M1 with the message M2 by means of the identity 24 of the point of sale 21. Moreover, the transaction system 3 generates and transmits a message M3 to the mobile device 11, the message M3 comprising the sum to be paid 25.

Eventually, the purchaser 1 approves or rejects the sum to be paid 25 on the mobile device 11. Thus, the mobile device 11 generates and transmits a message M4 to the transaction system 3, the message M4 comprising an approval or rejection 15 of the transfer of funds from the purchaser to the retailer according to the approved sum to be paid 25.

Further, the transaction system 3 performs transfer of the approved funds 31 from the purchaser 1 to the retailer 2. Where after, the transaction system 3 generates and transmits a message M5 to the point of sale 21, the message M5 comprises a confirmation 32 of the transfer of funds 31.

Messages M1, M2 are as described transmitted, differentiated by time, from each other, meaning that the invention is in no way depending on if the purchaser generates and transmits the message M1 by means of the mobile device 11 before or after that the point of sale generates and transmit the message M2.

Methods for moving funds from the account of the purchaser 13 to the account of the retailer 23 by means of a transaction system 3 are well known to the person skilled in the field of the present invention; hence this will not be described in more detail.

It is appreciated that the purchaser 1 is using a personal code on the mobile device 11 to approve the sum to be paid 25.

The identity of the point of sale 24 may be represented by a tag/label/RFID 24', and that the mobile device 11 translates the tag/label 24' into the identity of the point of sale 24.

This tag/label 24' can be a bar code, RFID, a quick response code, a data-matrix, or a proprietary code such as a ShotCode.

The point of sale 21 may be a physical point of sale, and this can be a stationary point of sale, such as a warehouse, a supermarket, a restaurant, a hair dresser or a petrol station, or a mobile point of sale, such as a point of sale that belongs to a bus, a train, a boat, a taxi, a mobile sales representative, or a mobile point of sale in a restaurant or the like.

Figure 3:
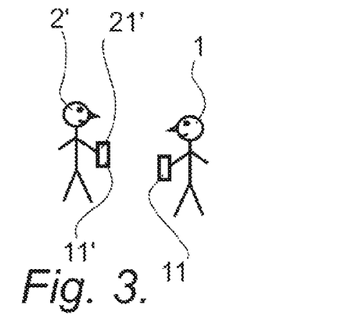
FIG. 3 is a schematic illustration of a personal device functioning as a point of sale.

According to one embodiment of the present invention illustrated in FIG. 3, it is appreciated that a personal device 11' functions as a point of sale 21', and that two person, the owner of the personal device 2' and the purchaser 1, utilizes the inventive method to transmit funds from the purchaser 1 to the owner 2' of the personal device 11', the personal device 11' being any personal device where through the owner of the personal device 2' can access the transaction system 3, such as a cellular telephone, a mobile computer or a stationary computer.

A traditional point of sale 21 is a cashier register 21a, as illustrated in FIG. 2, and in an embodiment where the present invention is implemented for a cashier register 21a it is appreciated that the cashier register 21a, directly or indirectly, generates the M2 message and receives the message M5.

It is possible to generate a receipt 26 for the transaction to the purchaser 2 from the point of sale 21.

Figure 4:
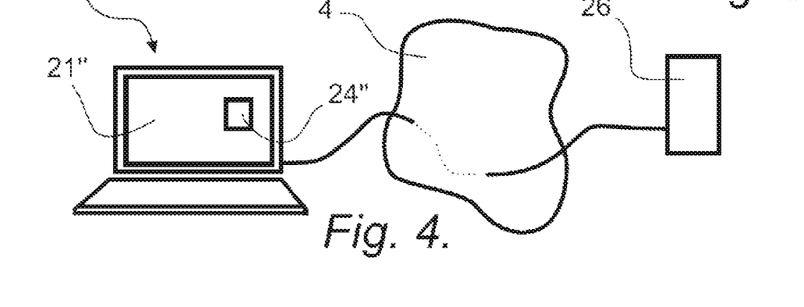
FIG. 4 is a schematic illustration of a virtual point of sale.

FIG. 4 illustrates that the point of sale can also be a virtual point of sale, such as an online shop available on the Internet 4.

In this case the point of sale 21" is a server 26 related to the retailer 2, and it is generated from the server 26 in a terminal 16 belonging to the purchaser 1. The server 26 generates the message M2 and receives the message M5.

With a virtual point of sale 21" it is appreciated that a unique identity for the point of sale 21' and a representation 24" of the unique identity is generated and displayed on the terminal 16 utilized by the purchaser 1 for each transaction.

Even if the point of sale 21 confirms the transfer of funds by a receipt 26 or in any other manner, it is appreciated that also the transaction system 3 can generate and transmit a message M6 to the mobile device 11, the message M6 comprising a confirmation 32 of the transfer of funds.

With a mobile point of sale it is appreciated that the point of sale 21 communicates with the transaction system 3 by means of wireless communication.

Also, the mobile device 11 communicates with the transaction system 3 by means of wireless communication.

With renewed reference to FIG. 1 now described is an arrangement A according to the present invention, comprising a mobile device 11, a point of sale 21 and a transaction system 3.

The inventive arrangement A is adapted to identify a purchaser 1 and a retailer 2 and to perform an economical transaction between the purchaser 1 and the retailer 2, the point of sale 21 belonging to the retailer 2 and the mobile device 11 belonging to the purchaser 1.

A mobile device 11 has a unique identity 14, which is connected to the owner of the mobile device, the purchaser 1. This unique identity can for instance be a telephone number, or a subscriber identity found on a SIM card belonging to the device.

The point of sale 21 and the transaction system 3 are adapted to communicate with each other, and the transaction system 3 is adapted to transfer funds 31 from the purchaser 1 to the retailer 2, or from an economical institution 13 belonging to the purchaser 1 to an economical institution 23 belonging to the retailer 2, according to given information from the purchaser and the retailer.

Now, with reference to FIGS. 1 and 2, it is depicted that the present invention in one embodiment specifically teaches that, the mobile device 11 and the transaction system 3 are adapted to communicate with each other, the mobile device 11 comprises a camera/RFID and like radio frequency receivers and/or transmitters 111, and the mobile device 11 is adapted to read an identity 24' of the point of sale 21 by means of the camera/RFID and like radio frequency receivers 111. As such, the mobile device 11 is adapted to generate and transmit a message M1, to the transaction system 3, the message M1 comprising the identity of the point of sale 24 and the identity of the mobile device 14.

Moreover, the point of sale 21 is adapted to generate and transmit a message M2, differentiated by time from the message M1, to the transaction system 3, the message M2 comprising the identity of the point of sale 24 and the sum to be paid 25. The transaction system 3 is adapted to match the message M1 with the message M2 by means of the identity of the point of sale 24, and the transaction system 3 is also adapted to generate and transmit a message M3 to the mobile device 11, the message M3 comprising the sum to be paid 25.

As for the mobile device 11 it is adapted to receive an approval or rejection 15 of the sum to be paid from the purchaser, and the mobile device 11 is also adapted to generate and transmit a message M4 to the transaction system 3, the message M4 comprising an approval or rejection 15 of the transfer of funds from the purchaser to the retailer according to the approved sum to be paid 25.

Furthermore, the transaction system 3 is adapted to perform the transfer of approved funds/payment 31 from the purchaser 1 to the retailer 2, and the transaction system 3 is moreover adapted to generate and transmit a message M5 to the point of sale 21, the message M5 comprises a confirmation 32 of the transfer of funds 31.

Means for moving funds from the account of the purchaser to the account of the retailer are found in the transaction system 3 and are well known to a skilled person in the present technical field. Hence, they will not be described in more detail.

The mobile device 11 is adapted to receive a personal code from the purchaser 1 in order for the purchaser to approve the sum to be paid 25.

The identity of the point of sale 24 can be represented by a tag/label/RFID 24', and the mobile device 11 is adapted to translate the tag/label 24' into the identity of the point of sale 24. The tag/label 24' can be a bar code, a quick response code, a data-matrix, RFID tag, or a proprietary code such as a ShotCode.

The point of sale 21 can be a physical point of sale, in which case it can be a stationary point of sale, such as a warehouse, a restaurant, a hair dresser or a petrol station, or a mobile point of sale, such as a point of sale that belongs to a bus, a train, a boat, a taxi, a mobile sales representative or a mobile point of sale in a restaurant, and the like.

With reference to FIG. 3, a schematic implementation of the present invention is illustrated where a personal device 11' is adapted to function as a point of sale 21, and where the personal device 11' and the mobile device 11 are adapted to enable two persons, the owner 2' of the personal device 11' and the purchaser 1, to transmit funds from the purchaser 1 to the owner 2' of the personal device 11'. The personal device 11' can be any personal device where through the owner 2' of the personal device can access the transaction system 3, such as a cellular telephone, a mobile computer, an iPad™, touchpad, iPhone™, android phone, or stationary computer and the like.

The point of sale 21 may also be a cashier register, as illustrated in FIG. 2, in which case the cashier register can be adapted to generate the message M2 and receive the message M5.

Furthermore, the point of sale 21 can be adapted to generate a receipt 26 for the transaction to the purchaser 1.

FIG. 4 illustrates that the point of sale 21" also may be a virtual point of sale hosted by a server 26 related to the retailer 2, in which the point of sale 21" is an online shop available on the Internet 4 and displayed to the purchaser on a terminal 16 utilized by the purchaser.

This server 26 may be adapted to generate the message M2 and receive the message M5. The server 26 may also be adapted to generate a unique identity for the point of sale 21" and a representation 24" of the unique identity and to display a representation of the identity 24" on the virtual point of sale 21" for each transaction.

Regardless of if the point of sale provides 21 a receipt 26 to the purchaser 1 or not, it is appreciated that the transaction system 3 can be adapted to transmit a message M6 to the mobile device 11, the message M6 comprising a confirmation 32 of the transfer of funds 31.

If the point of sale 21 is a mobile point of sale it is appreciated that it is adapted to communicate with the transaction system 3 by means of wireless communication.

To summarize, the present invention in one embodiment provides a method, and an arrangement, to identify a purchaser 1 and a retailer 2, and performing a secure electronic payment between purchaser 1 and retailer 2, and where said purchaser is in front of said retailer 2 point of sale. In front of a point of sale is interpreted as either a physical POS or a virtual as mentioned for instance a homepage on the Internet. By the expression payment any transfer of payment between parties is considered such as for goods, services, peer-to-peer, and the like. Hereby, the purchaser 1 has a mobile device 11 comprising a camera/RFID/WIFI and like radio frequency receivers and/or transmitters utilized to conduct a purchase. The invention thus comprises that both the point of sale 21, 24, and the purchaser 1 communicating with an account aware transaction system 3. The transaction system 3 settles transfer of payment from the purchaser 1 to the retailer 2 by signals transmitted through different channels of communication. The point of sale 21, 24 communicates through at least one of a wired first channel, and a wireless first channel of communication, and the mobile device communicates wireless via a second cellular radio channel. Each single purchase is provided a unique transaction reference through the transaction system.

The mobile device 11 is operated by the purchaser 1 to identify the point of sale 21, 24 by means of the camera/RFID and like radio frequency receivers photographing/reading a tag placed at the point of sale uniquely identifying the single point of sale 21, 24. Thereafter generating through the mobile device 11 and transmitting a signed message to the transaction system through the second channel. The message comprises the identity of the point of sale 21, 24 and the identity of the mobile device 11 derived through software processing the photographed/read tag.

Automatically by prompting, through the point of sale 21, 24, generating at least one message, and transferring the at least one message on the first channel, independently differentiated by time from the message transmitted from the mobile device to the transaction system on the second channel, to the transaction system. The at least one message, comprises at least the identity of the point of sale, and the sum to be paid by the purchaser. Automatically by prompting has the meaning of for instance a cashier at a POS has to initiate the automatic transmission of a message, e.g. by pushing a specific button or the like when a purchaser has finished a purchase.

An account aware transaction system 3 matches through the transaction system the at least one message transmitted from the point of sale through the first channel with the message transmitted from the mobile device through the second channel to decide similarity through the identity of the point of sale. In this context account aware means that the transaction system 3 not relies upon a credit card clearing house as commonly, but that the transaction system 3 of the present invention comprises information about all purchaser and retailer accounts in the system.

Furthermore, the purchaser has to approve the sum to be paid by prompting the mobile device to transmit to the transaction system a go-ahead if the matching determines similarity between the point of sales identity transmitted via the first and second channel. Hence, the purchaser's particulars thus being anonymous to the point of sale, but both the point of sale and the purchasers purchase identity being known by the transaction system 3, settling the payment by withdrawing payment from the purchaser, and crediting the account relating to the point of sale for a purchase provided its unique transaction reference by means of for instance software.

It is appreciated that messages like M1 to M6 in one embodiment can be encoded, and signaled through the first channel, and second channel in accordance with the description in the latter, whereby signals from the point of sale are transmitted on the first channel, and signals from the mobile device on the second channel. It is also appreciated that the number of transmissions M1 to M6 are only examples of many others of how a communication to and from an account aware transaction system can be accomplished.

Figure 5:
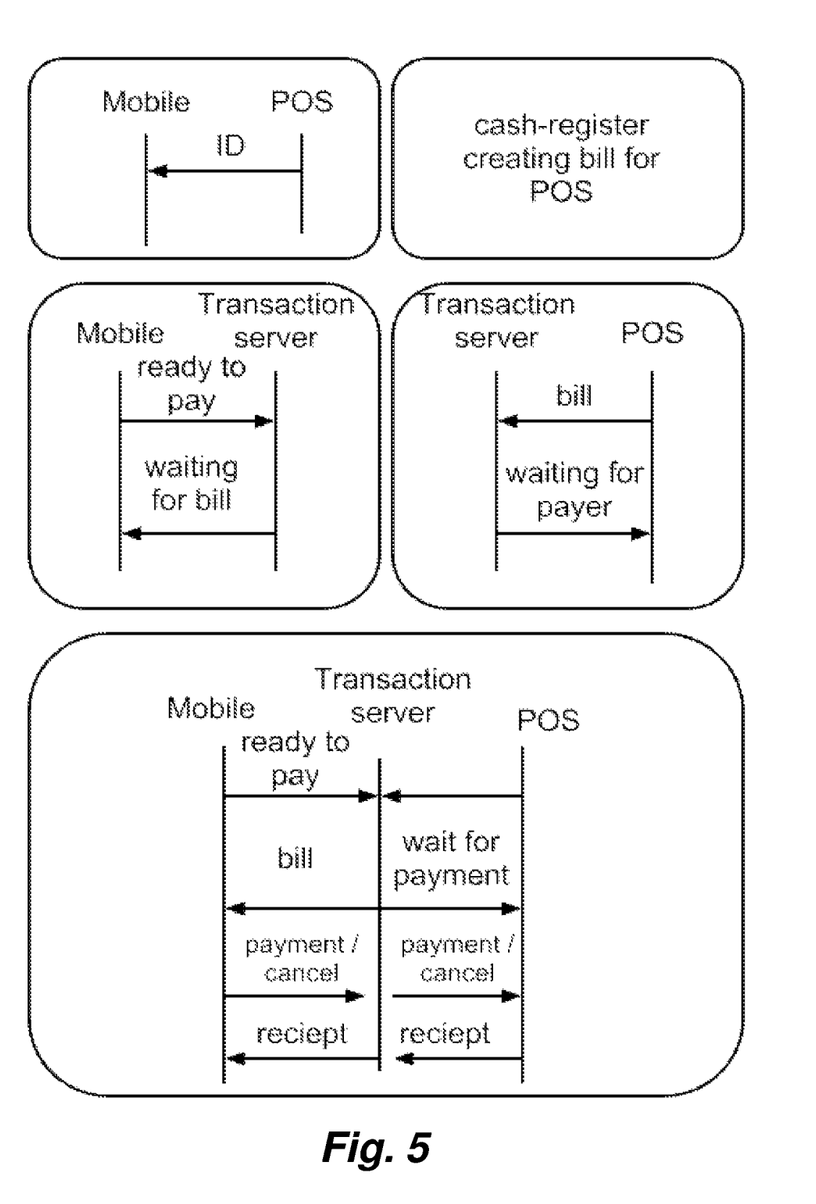
FIG. 5 schematically Illustrates the signalling between a point of sale, and a purchaser through a transaction system in accordance with the present invention.

FIG. 5 schematically illustrates the signalling between a point of sale, and a purchaser through a transaction system in accordance with the present invention. The FIG. 5 is self-explanatory for a person skilled in the art of the present invention. Though, it illustrates how key information in the secure transaction is matched and brokered by the transaction server 3 between the point of sale 21, 24 and mobile device 11.

Furthermore, the present invention provides a computer program product comprising computer program code, which, when executed by a mobile device enables the mobile device, comprising a camera/RFID/WIFI and like radio frequency receivers and/or transmitters, to perform the following steps of reading an identity by software in the mobile device at a single point of sale by means of the camera/RFID and like radio frequency receivers taking a footage of/reading the identity.

In one embodiment the computer program product sets forth that suitable parts of the mobile device conducts the method relating to said mobile device of the attached claims 1 to 13 in program code.

Still further the present invention provides a computer program product comprising computer program code, which, when executed by a single point of sale enables the point of sale wherein suitable parts relating to the point of sale conduct the method steps of claims 1 to 13 in program code. This is to perform the steps of transmitting its identity by prompting it to perform the transmission. The identity is transmitted to an account aware transaction system 3 to be matched with a message transmitted, independent by time, from a mobile device comprising the point of sales identity to settle a purchase if both transmitted identities match.

Moreover, the present invention provides a computer program product comprising computer program code, which when executed by an account aware transaction system 3 enables the system 3 to perform suitable parts, regarding the transaction system, of the method steps of the attached claims 1 to 13 in program code, thereby, performing the steps such as matching the transmitted identities from a mobile device, and a point of sale, and settling the accounts in a purchase between a mobile device, and a point of sale. Hereby, transmitting messages to the point of sale, and the mobile device.

In the attached set of drawings, the different computer program products 5, 6, 7 are illustrated as being operable within a unit and stored in a memory area of this unit.

However, it is appreciated that the computer program products 5, 6, 7 also can be stored in any kind of computer readable medium, volatile or non-volatile, to make it available for commercialization and distribution.

In all communication described above it is depicted that different generated and transmitted messages comprise particular information, it will be understood that these messages may comprise further information not specified here, information required to safeguard the communication or other information that might be required to identify the purchaser and/or retailer in the transaction system in order to perform the transfer of funds.

It is appreciated that the invention is not restricted to the latter description, and illustrated exemplifying embodiments thereof, and that modifications can be made within the scope of the invention as defined by the accompanying attached claims.

The invention claimed is:

1. A method of identifying a purchaser at a retailer, point of sale, and performing a secure electronic payment between the purchaser and the retailer, wherein the purchaser has a mobile device comprising at least one of; a camera, a radio frequency receiver and a radio frequency transmitter utilized to conduct a purchase, comprising:

an account aware transaction system receiving communication from both the point of sale, and the purchaser, the transaction system settling the transfer of payment from the purchaser to the retailer by signals transmitted through different channels of communication, whereby the transaction system receives communication from the point of sale through at least one of a wired first channel, and a wireless first channel of communication, and the transaction system receives communication from the mobile device via a second wireless radio frequency channel;

the transaction system providing each purchase with a unique reference identity;

the transaction system receiving at least one signed mobile device message that was generated and transmitted by said mobile device through the second channel, the message comprising the identity of the mobile device and the identity of the point of sale having been derived from a tag visually placed at the point of sale and read by the mobile device;

the transaction system receiving at least one point of sale message that was generated by automatic prompting and transmitted by the point of sale on the first channel independently from the mobile device message to the transaction system, the at least one point of sale message having a part comprising at least the identity of the point of sale and the sum to be paid by the purchaser;

the transaction system comparing the at least one point of sale message with the mobile device message to match the point of sale message with the mobile device message and deciding a match when the identity part of the point of sale message matches the identity part of the mobile device message;

the transaction system issuing a transaction matched signal to the mobile device; and the transaction system receiving a go-ahead signal transmitted by the mobile device comprising approval from the purchaser of the sum to be paid and of a match between the point of sale identity and the mobile device identity, and the transaction system settling the payment by withdrawing payment from the purchaser, and crediting the account relating to the point of sale for the unique transaction reference provided to a single purchase.

2. A method according to claim 1, wherein the transaction system prompts the purchaser to utilize a personal code on the mobile device to approve said sum to be paid.

3. A method according to claim 1, wherein the visual tag is at least one of a bar code, a quick response code, a data matrix, RFID tag, and a proprietary code.

4. A method according to claim 1, wherein the point of sale, is a point of sale portable device comprising at least one of a cellular telephone, smart phone, a laptop computer, a touchpad, and a stationary computer.

5. A method according claim 1, wherein the point of sale is a cashier register, and that the cashier register is generating messages by prompting it.

6. A method according to claim 1, wherein the transaction system prompts the point of sale to generate a receipt to the purchaser.

7. A method according to claim 1, wherein the point of sale is a virtual point of sale.

8. A method according to claim 1, wherein the point of sale is an online shop available on the Internet.

9. A method according to claim 1, wherein the point of sale is a server related to the retailer, and that the transaction system receives at least one message that was generated by the server, and generates messages to the server.

10. A computer program product comprising computer program code, which, when executed by a single point of sale enables said point of sale wherein parts relating to said point of sale conduct the method step of claim 1 in program code to perform the steps of:

transmitting its identity by prompting it to perform said transmission; and transmitting said identity to an account aware transaction system; and expecting a payment confirmation or denial.

11. A computer program product comprising computer program code, which, when executed by an account aware transaction system enables said system to perform parts of said method step of claim 1 in program code to perform the steps of:

matching the transmitted identities from a mobile device, and a point of sale; settling the accounts in a purchase between a mobile device, and a point of sale;
and transmitting messages to said point of sale, and said mobile device.

12. A method according to claim 1, wherein the identity of the point of sale received by the transaction system in the at least one signed mobile device message is obtained by the mobile device operated by the purchaser by at least one of: a camera photographing, or a radio frequency receiver reading the tag, and translating the tag into the identity of the point of sale.

13. An arrangement adapted to identify a purchaser and a retailer point of sale, and performing a secure electronic payment between said purchaser and said retailer, whereby said purchaser has a mobile device comprising a at least one of a camera, a radio frequency receiver, and a radio transmitter utilized to conduct a purchase, comprising:

an account aware transaction system to be utilized to communicate with both said point of sale, and said purchaser, said transaction system being adapted to settles transfer of payment from said purchaser to said retailer, said point of sale arranged to communicate through at least one of a wired first channel, and a wireless first channel of communication, and said mobile device arranged to communicate with the transaction system via a second wireless radio channel whereby transaction signals can be communicated with the transaction system through different channels of communication;

means in said transaction system adapted to provide each single purchase with a unique reference identity;

a tag placed at said point of sale and recording a unique identity of the point of sale in a form readable by the mobile device camera and/or radio frequency receiver;

said adapted mobile device operable by said purchaser to read the unique identity of the point of sale by means of the camera photographing, and/or radio frequency receiver, reading the point of sale unique identity from the tag;

said mobile device adapted to execute software code to generate at least one signed mobile device message and transmit the mobile device message to said transaction system through said second channel, said mobile device message comprising the identity of said point of sale and said identity of said mobile device in response to reading the point of sale unique identity;

said point of sale adapted to automatically generate, by prompting, at least one point of sale message, and to transmit said at least one message on said first channel, said at least one message comprising at least the identity of the point of sale and the sum to be paid by said purchaser;

said transaction system responsive to receiving the mobile device message and the encrypted point of sale message to match the messages when the respective message parts identifying the point of sale are similar; and said transaction system responsive to matching the messages to prompt said mobile device for purchaser approval of the transaction including the sum to be paid said mobile device adapted to respond to purchaser approval to transmit to said transaction system a go-ahead signal whereby the purchasers particulars remain anonymous to said point of sale, but both said point of sale and said purchasers identity are known by said transaction system;

said transaction system responsive to the go-ahead signal to settle the payment by withdrawing payment from said purchaser, and crediting the payment to an account relating to said point of sale for said unique transaction reference provided to a single purchase.

14. An arrangement according to claim 13, wherein the purchaser utilizes a personal code entered to the mobile device to approve said sum to be paid.

15. An arrangement according to claim 13, wherein said tag records the unique identity of the point of sale by at least one of a bar code, a quick response code, a data matrix, RFID tag, NFC tag or a proprietary code.

16. An arrangement according to claim 13, wherein a portable device is adapted to function as a point of sale, and that two persons, the owner of the personal device, and the purchaser having a portable device, utilizes said devices to transmit funds from the purchaser to the owner of said point of sale portable device, said devices being portable devices by which they access said transaction system, whereby said point of sale is at least one of a cellular telephone, smart phone, a laptop computer, a touchpad, and a stationary computer.

17. An arrangement according claim 13, wherein said point of sale is a cashier register, and that said cashier register is adapted to generate messages by prompting it.

18. An arrangement according to claim 13, wherein said point of sale is adapted to generate a receipt to the purchaser.

19. An arrangement according to claim 13, wherein said point of sale is a virtual point of sale.

20. An arrangement according to claim 13, wherein said point of sale is an online shop available on the Internet.

21. An arrangement according to claim 13, wherein said point of sale is a server related to said retailer, and that said server is adapted to generate at least one message to said transaction system, and to receive messages from said transaction system.

* * * * *